Mar. 6, 1923. 1,447,833.
H. S. BOOTH.
ROTARY ENGINE.
FILED FEB. 13, 1919. 6 SHEETS—SHEET 1.
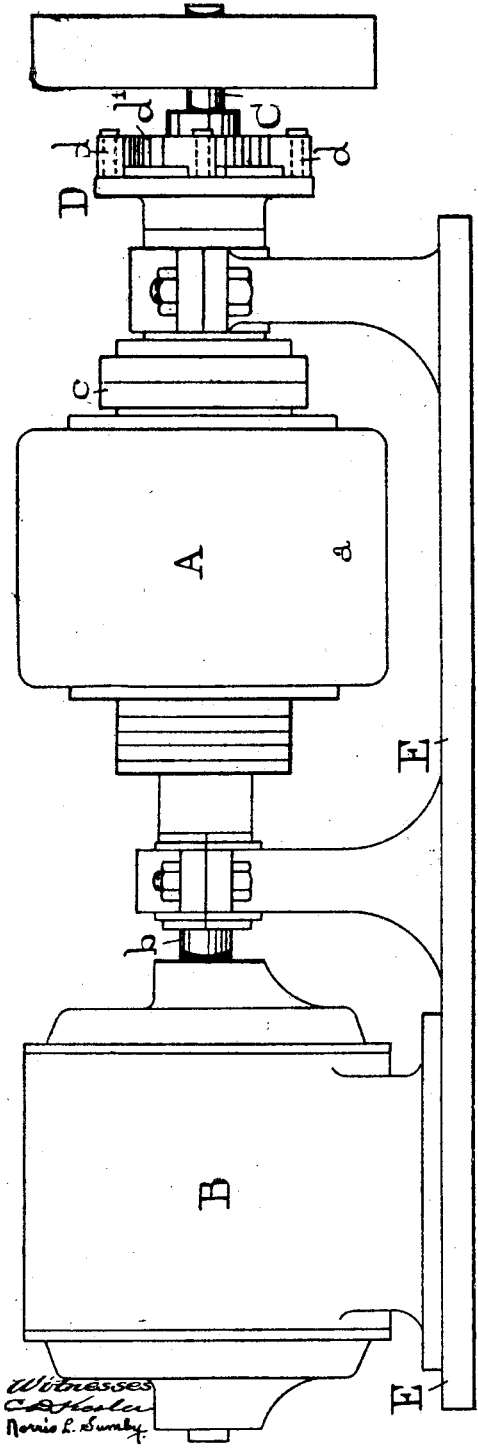
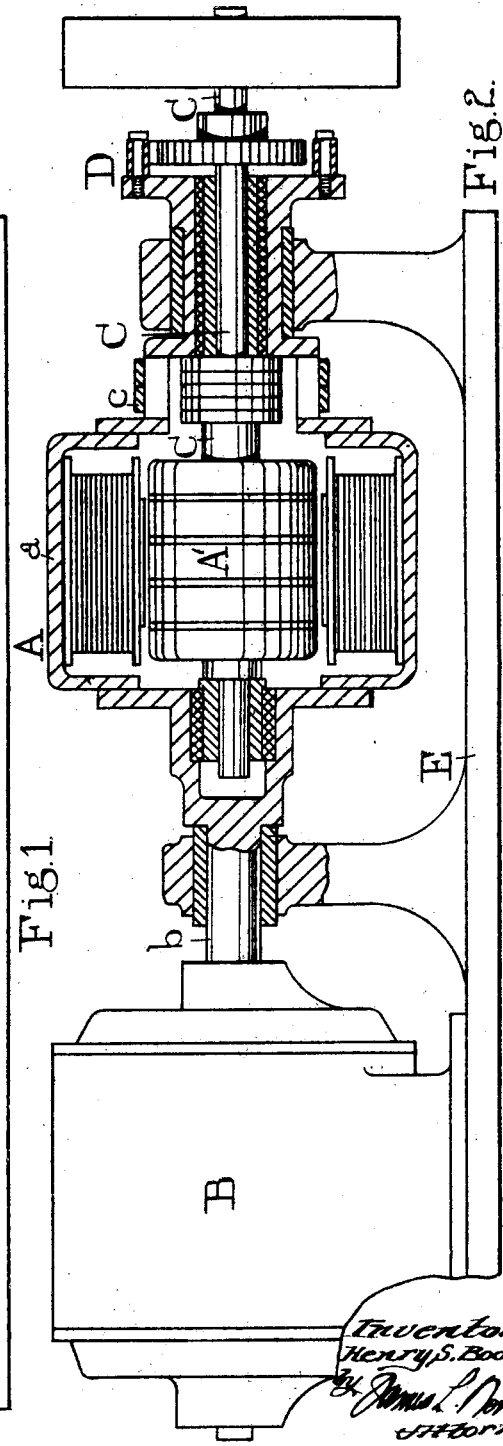

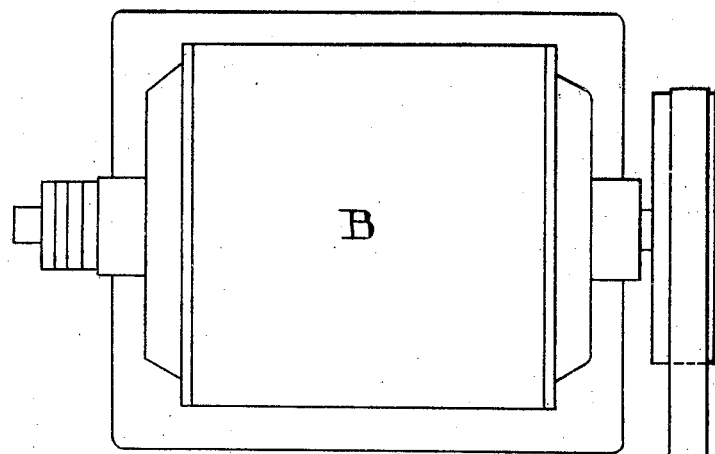
Fig. 4.
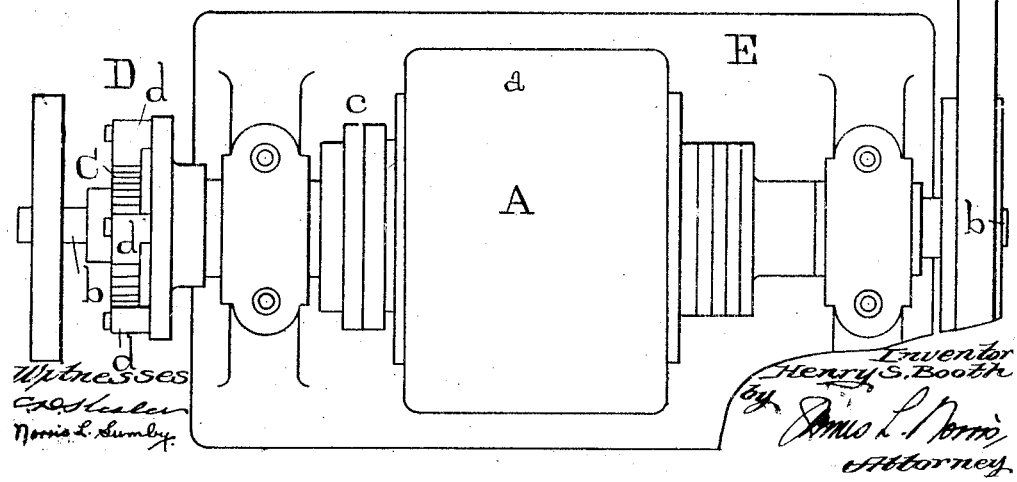

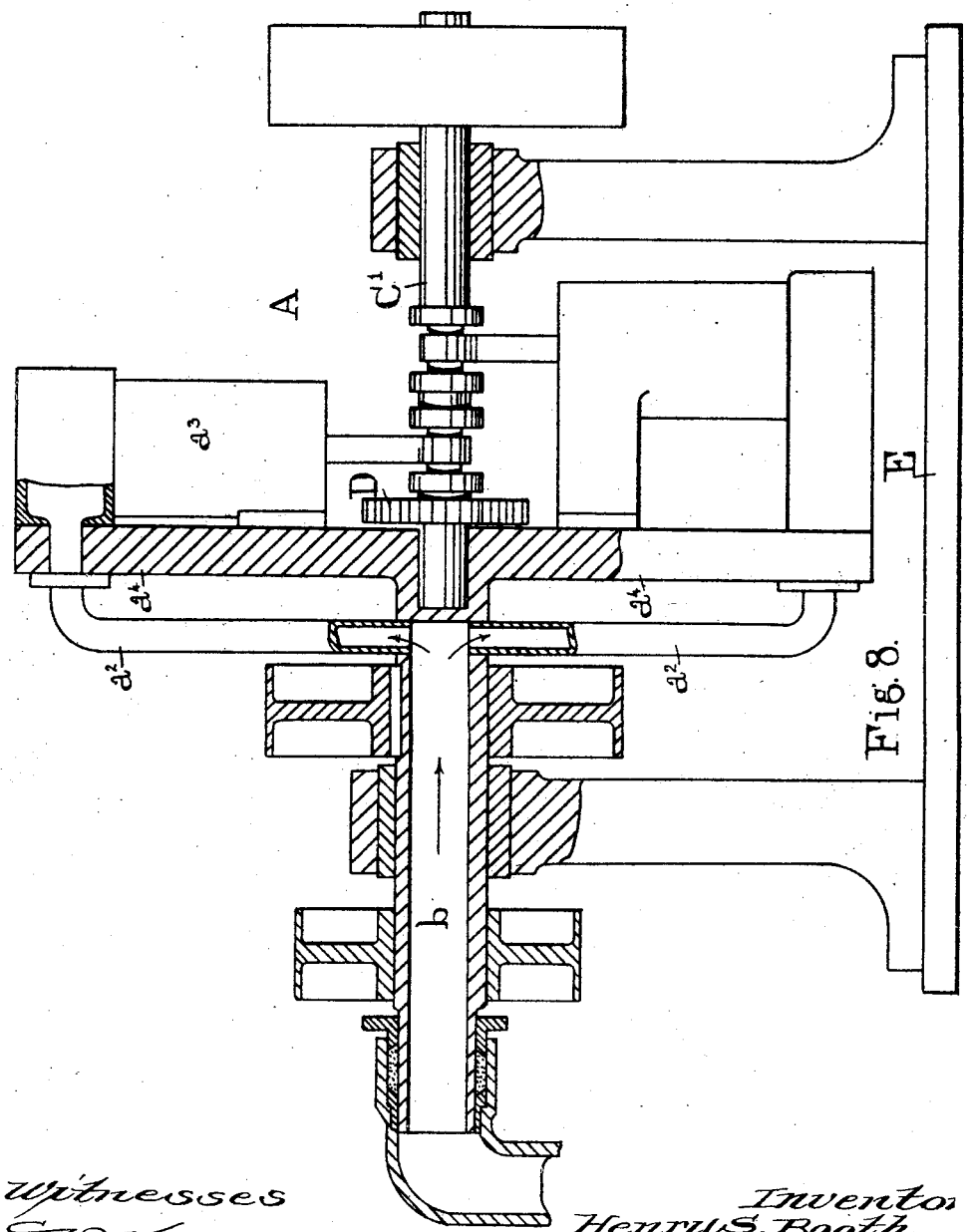

Patented Mar. 6, 1923.

1,447,833

UNITED STATES PATENT OFFICE.

HENRY SHEPLEY BOOTH, OF MANCHESTER, ENGLAND.

ROTARY ENGINE.

Application filed February 13, 1919. Serial No. 276,797.

*To all whom it may concern:*

Be it known that I, HENRY SHEPLEY BOOTH, a British subject, residing at Manchester, county of Lancaster, England, have invented certain new and useful Improvements in Rotary Engines, of which the following is a specification.

This invention relates to improvements in rotary engines or motors and has for its object the provision of an apparatus consisting of two independent motors furnished with independent supplies of power in such a manner that the velocity imparted to the first of the pair of motors is greater than the velocity added thereto by the second and in which the first prime mover provides a moving base against which the second can act through the interposition of a one-way clutch which will permit of the second motor rotating in advance of or at a higher rate of speed than the first.

It will be fully described with reference to the accompanying drawings in which it is shown applied to various types of motors.

Figs. 1 and 2 are elevation and longitudinal sections showing the invention applied to an electric motor.

Fig. 4 is a plan showing invention applied to an electric motor connected to a primary motor by a driving belt.

Figs. 7 and 8 are elevation partly in section and end elevation showing the invention applied to a motor with reciprocating pistons.

A motor A of any type is constructed with the stator or body $a$—which is usually fixed—free to rotate and attached to or connected with a primary motor B or other source of power by which it is rotated. The shaft C of the secondary motor A is connected to the casing $a$ which constitutes a stator by a one way clutch D, so that as the casing $a$ rotates the shaft C will also be rotated, and at the same time is free to have its speed accelerated and rotate at a higher speed than the casing $a$ when power is applied to the secondary motor A.

Figure 3:
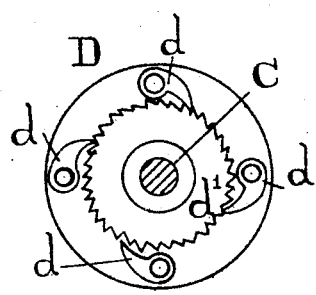
Fig. 3 is a detail of one way clutch.

Referring to Figs. 1, 2 and 3 of the drawings, in which the invention is shown applied to an electrically driven motor, the primary motor B is of any ordinary construction mounted on a bed plate E which also supports or carries bearings for the secondary motor A. The casing of the secondary motor A is attached to or connected with the shaft $b$ of the primary motor B and rotates with it. The rotor A' and shaft C of the secondary motor A are co-axial with the shaft $b$ of the motor B, and are connected by a one way clutch D, (Fig. 3) with pawls $d$ and ratchet wheel $d'$ by which the shaft C is rotated at the same speed as the shaft $b$ but is free to rotate at a higher speed. Current is supplied to the secondary motor A through insulated wipe connections or slip rings $c$ and the electric mains are led to one set of these rings and back from the other set. These connections permit current from any source of supply to flow and return without regard to the speed at which the parts are rotating.

In Fig. 4 the secondary motor A is shown connected to the primary motor by a driving belt by which it is rotated but in other respects is similar to that shown and described in Figs. 1 and 2.

In operation assuming that the primary motor B runs light at 2,000 revolutions per minute and the secondary or induction motor A at 1,000 revolutions per minute, the operation of the engine would be as follows:—

The motor B being started the rotor A' of the motor A through the pawl and ratchet wheel arrangement D, would rotate with it, until at 2,000 revolutions per minute the acceleration would cease and the motor run light. The current being then passed through the coils the stator $a$ would actuate the rotor A' until its speed became increased to a further 1,000 revolutions per minute or 3,000 revolutions in all; the reaction against the stator $a$ being balanced by equivalent power taken up by the motor from its separate supply of electricity. If work be now performed by the rotor shaft C the reaction would be balanced in a similar manner and the maximum output of the engine increased because of the extra velocity imparted to the secondary shaft C by the described arrangement.

Figure 6:
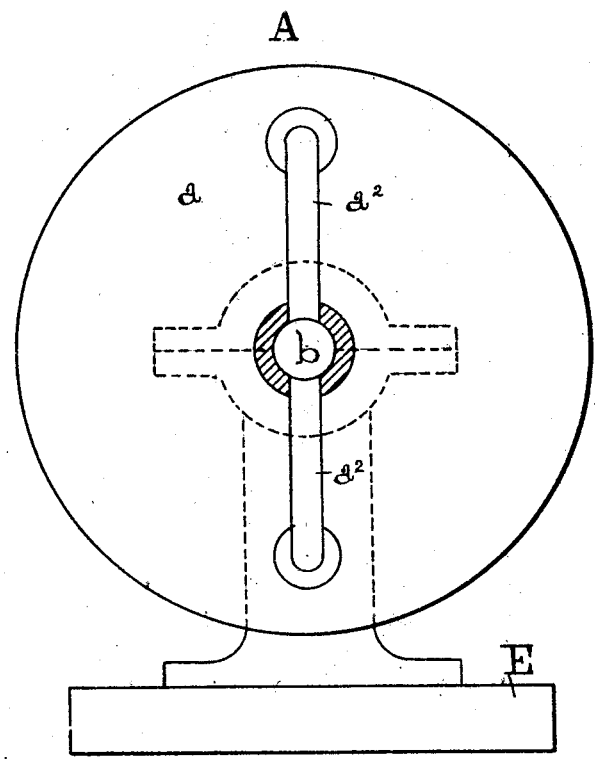
Figs. 5 and 6 are longitudinal sections and end elevation showing the invention applied to a steam turbine.
Figure 5:
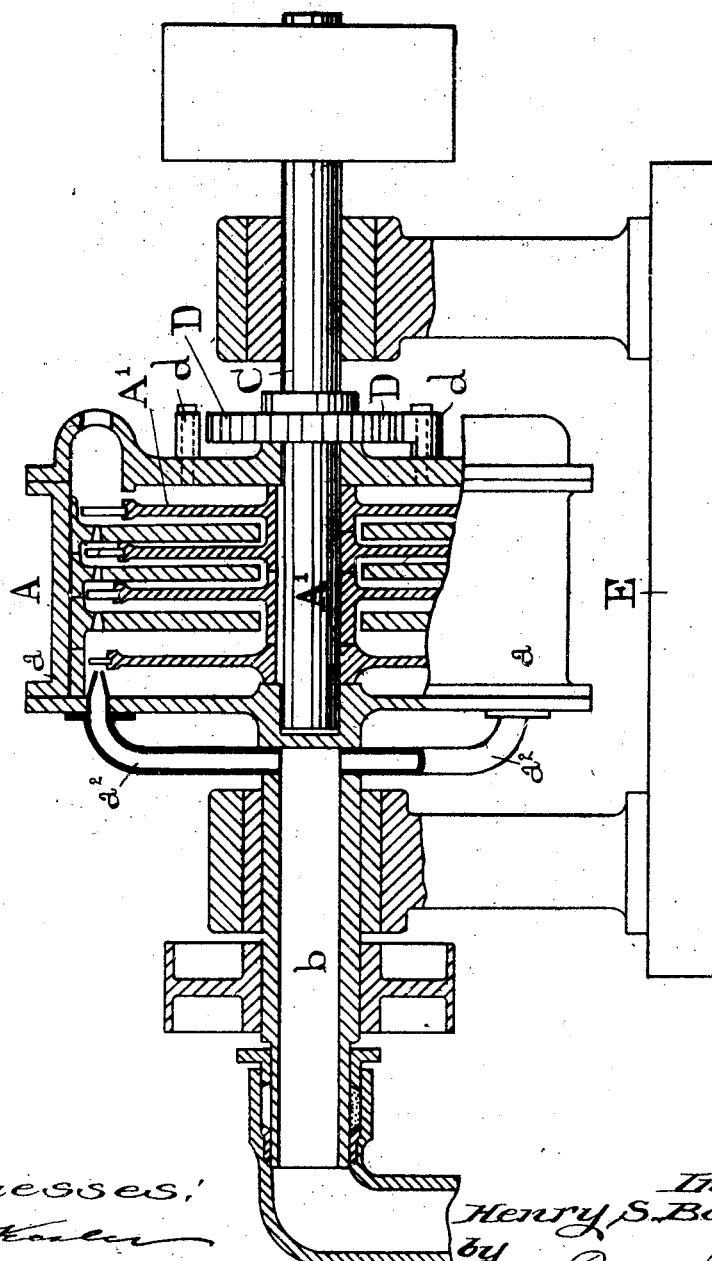

Referring to Figs. 5 and 6 of the drawings in which the invention is shown applied to a steam turbine A, the primary motor (not shown) may be a turbine or electric or other motor of ordinary construction driving a shaft $b$. The casing $a$ constituting the stator of the secondary motor A is attached to or connected with the shaft $b$ and rotates with it. The rotor A' and shaft C of the turbine or secondary motor A are co-axial with the shaft $b$ and are connected by a one way clutch D, (such as shown in Fig. 3) by which the shaft C is rotated at the same speed as the shaft $b$ but is free to rotate at a higher speed. Steam is supplied to the turbine or secondary motor A through steam pipes $a^2$ the shaft $b$ being hollow to receive steam from a suitable connection.

In operation assuming that the shaft $b$ of the primary motor runs light or is governed at 2,000 revolutions per minute and the turbine or secondary motor A is governed at 3,000 revolutions per minute, on the primary motor and shaft $b$ being started the rotor A' of the turbine A and its shaft C will, through the clutch D, rotate with it at 2,000 revolutions. On steam being admitted to the rotor A' of the turbine the speed of the shaft C will be increased by a further 1,000 revolutions until it reaches 3,000 revolutions per minute. The reaction against the stator $a$ is balanced by the equivalent power supplied to the motor. If work be now performed by the rotor shaft C the reaction would be balanced in a similar manner and the maximum output of the engine increased because of the extra velocity imparted to the secondary shaft C by the described arrangement.

Figure 7:
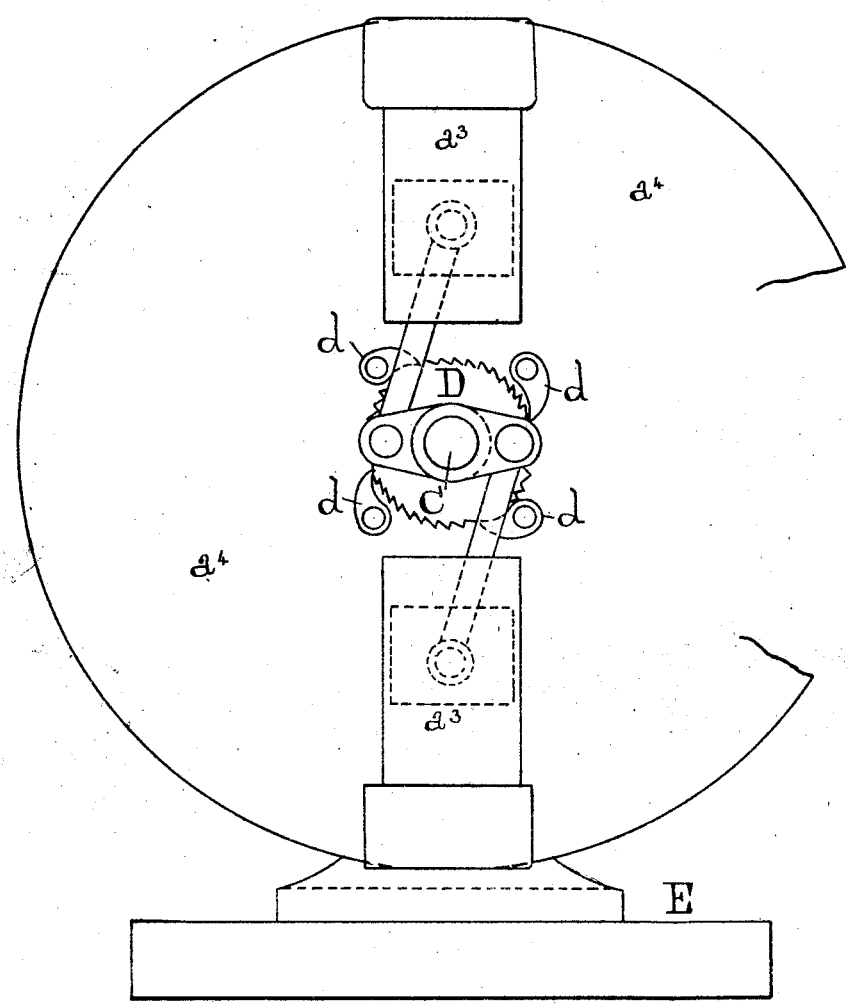

Referring to Figs. 7 and 8 of the drawings in which the invention is shown applied to a motor with reciprocating pistons, the primary motor (not shown) may be a piston motor, turbine or electric motor of any ordinary construction driving a shaft $b$. The cylinders $a^3$ of the secondary motor A are mounted on a rotary plate or frame $a^4$ attached to or connected with the shaft $b$, and rotate with it. The crank shaft C' is coaxial with the shaft $b$ and the crank shaft is connected with the rotary plate or frame $a^4$ by a one way clutch D (such as shown in Fig. 3) by which the crank shaft is rotated at the same speed as the shaft $b$ but is free to rotate at a higher speed. The invention may also equally be applied to engines with cylinders rotating round a fixed shaft such as the Gnome type.

Steam or compressed air or combustible gases are supplied to the cylinders of the secondary motor A through pipes $a^2$ the shaft $b$ being hollow to receive the fluid from a suitable connection.

In operation assuming that the shaft $b$ of the primary motor runs light or is governed at 2,000 revolutions per minute and the secondary motor A is governed at 3,000 revolutions per minute, on the primary motor and shaft $b$ being started the cylinders $a^3$ and crank shaft C' will—through the clutch D—rotate with it at 2,000 revolutions. On the pistons in the cylinders $a^4$ being operated, the speed of the crank shaft will be increased by a further 1,000 revolutions until it reaches 3,000 revolutions per minute. The reaction of the pistons against the cylinders $a^3$ is balanced by the equivalent power supplied to them. If work be now performed by the crank shaft C' the reaction would be balanced in a similar manner and the maximum output of the engine increased because of the extra velocity, imparted to the crank shaft C' by the described arrangement.

What I claim as my invention and desire to protect by Letters Patent is:—

1. A primary motor and a secondary motor each fed from an independent source, a stator for the secondary motor fixed to the rotor shaft of the primary motor and a one-way clutch connecting the rotor shaft of the secondary motor to the rotor shaft of the primary motor, said clutch acting in such direction that the rotor shaft of the secondary motor can overrun the rotor shaft of the primary motor.

2. In combination a primary motor and a secondary motor independently supplied with power, a stator for the secondary motor rotating as a unit with the rotor of the primary motor so as to step up the velocity of the rotor shaft of the secondary motor relative to the velocity of the rotor shaft of the primary motor, a one-way clutch connecting said rotor shafts to permit this velocity differential in favor of the rotor shaft of the secondary motor, a retardation in the velocity of the rotor shaft of the secondary motor being transmitted back to the primary motor and to the rotating stator of the secondary motor which is unitarily connected therewith.

In testimony whereof I have hereunto set my hand in presence of two subscribing witnesses.

HENRY SHEPLEY BOOTH.

Witnesses:
I. OWDEN O'BRIEN.
I. GREEVES O'BRIEN.